United States Patent [19]

Naoi

[11] Patent Number: 4,760,323
[45] Date of Patent: Jul. 26, 1988

[54] VOLTAGE REGULATOR FOR GENERATOR

[75] Inventor: Keigo Naoi, Katsuta, Japan

[73] Assignee: Hitachi, Ltd., Tokyo, Japan

[21] Appl. No.: 757,495

[22] Filed: Jul. 22, 1985

[30] Foreign Application Priority Data

Jul. 24, 1984 [JP] Japan ................................ 59-153719

[51] Int. Cl.4 ............................................... H02P 9/00
[52] U.S. Cl. ........................................ 322/33; 320/35; 320/64
[58] Field of Search ........................ 322/33; 320/35, 64

[56] References Cited

U.S. PATENT DOCUMENTS

| | | | |
|---|---|---|---|
| 3,496,447 | 2/1970 | Thompson | 322/33 |
| 3,522,482 | 8/1970 | Thompson . | |
| 3,535,616 | 10/1970 | Rutherford et al. | 322/28 |
| 3,643,153 | 2/1972 | Hanson et al. | 322/33 |
| 3,718,849 | 2/1973 | Nolan et al. | 320/61 |
| 4,435,676 | 3/1984 | Morishita | 322/33 |
| 4,563,631 | 1/1986 | Mashino et al. | 320/64 |

FOREIGN PATENT DOCUMENTS 1813934 12/1968 Fed. Rep. of Germany .

Primary Examiner—Patrick R. Salce
Assistant Examiner—Anita M. Ault
Attorney, Agent, or Firm—Antonelli, Terry & Wands

[57] ABSTRACT

A voltage regulator for a generator wherein a switching device connected in series to the field coil of the generator is adapted to be controlled in accordance with an output voltage of the generator and the ambient temperature at the voltage regulator so as not to exceed the junction temperature limit value of the switching means.

5 Claims, 3 Drawing Sheets

VOLTAGE REGULATOR FOR GENERATOR

BACKGROUND OF THE INVENTION

The present invention relates to a voltage regulator for a generator, and particularly concerns a voltage regulator suitable for use with an AC generator for charging an automobile battery.

The generator voltage required for sufficiently charging the battery is relatively high at a low temperature, while it is relatively low at a high temperature. Thus, as widely known in the art, it is desirable, for the regulator used with an AC generator charging an automobile battery, to control the retaining voltage level in accordance with the ambient temperature change.

A method introduced in the specification of U.S. Pat. No. 3,718,849 for example, proposes to vary the regulating voltage for a voltage regulator in accordance with the detected temperature at the voltage regulator.

In the above prior art, the ambient temperature at the voltage regulator is detected so as to vary the regulating voltage. However, in this case, only when the detected ambient temperature is relatively high, the regulating voltage is lowered. This is because the above method aims at meeting the requirements of battery charging properties and electrical load (motor, actuator, and so on) properties. The field current of a self-excitation generator at a duty ratio of 100% is however given by $$I_F = (V_S - V_F)/R_F$$

wherein $I_F$ represents a field current (A), $V_S$ represents a regulating voltage (V), $V_F$ represents the voltage drop of a power transistor, and $R_F$ represents resistance ($\Omega$) of a field coil. Therefore, the change of a field current $I_F$ caused by the change of a regulating voltage $V_S$ is relatively small, e.g., in the temperature range of minus 10 to plus 90° C., the change of field current is about 10%.

Apart from the above, a marked tendency to mount an engine in a small space within the automobile is seen lately. Thus, the ambient temperature at the generator is likely to rise high. So there arises a risk that the temperature of semiconductor elements might exceed an allowable junction temperature due to the heat generation by the voltage regulator.

SUMMARY OF THE INVENTION

It is an object of the present invention to provide a voltage regulator for a generator charging a battery, wherein even if the ambient temperature at the voltage regulator rises abnormally high, possible thermal breakage of the semiconductor elements constituting the voltage regulator can be avoided.

The present invention features in that the semiconductor elements can be protected from thermal breakage even at an abnormal ambient temperature rise at the voltage regulator for the battery charging generator, by controlling a maximum conduction ratio of a power transistor in the voltage regulator in accordance with the temperature at the voltage regulator.

DESCRIPTION OF THE PREFERRED EMBODIMENTS

Figure 1:
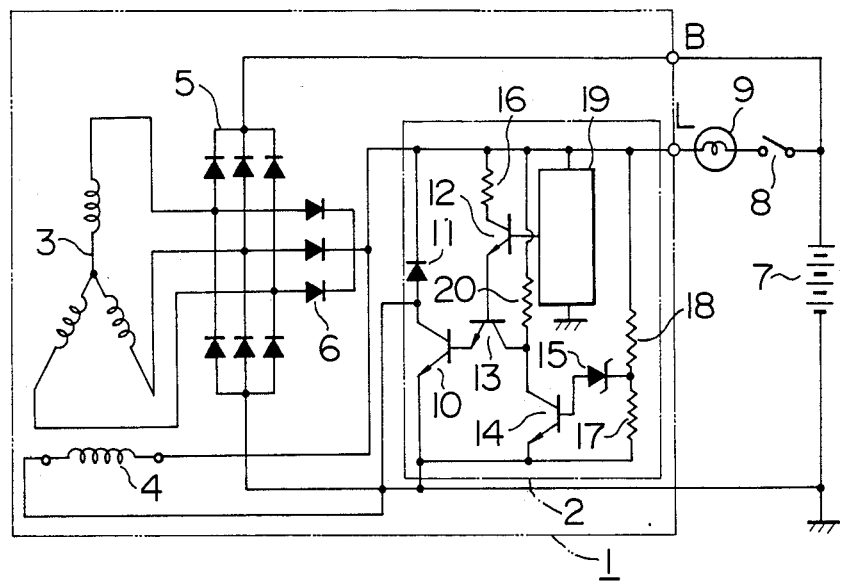
FIG. 1 is a circuit diagram of a voltage regulator with a generator according to an embodiment of the present invention.

An embodiment of the present invention is shown in FIG. 1. In the figure, a star-connected armature coil 3 is connected to a battery 7 via a three-phase full-wave rectifier 5. The (+) terminal of the battery 7 is connected to one end of a charge lamp 9 through a key switch 8. The other end of the charge lamp 9 is connected to a terminal L. Connected to this terminal L are one end of a field coil 4, a cathode of a flywheel diode 11, one end of a first resistor 16, one end of a third resistor 18 constituting part of a voltage divider, one end of a conduction ratio control circuit 19, and one end of a resistor 20. The other end of the field coil 4 is connected to ground. The anode of the flywheel diode 11 is connected to the collector of a power transistor 10, the emitter of which is grounded and the base is connected to the emitter of a first transistor 13. The emitter of the power transistor 10 is also connected to the (−) terminal of the battery 7.

The other end of the first resistor 16 is connected to the collector of a second transistor 12, the emitter of which is connected to the base of the first transistor 13. The base of the second transistor 12 is connected to the conduction ratio control circuit 19. To the collector of the first transistor 13, the other end of the second resistor 20 and the collector of a third transistor 14 are connected. The emitter of the third transistor 14 is grounded, the base thereof being connected to the anode of a Zener diode 15. The cathode of the Zener diode 15 is connected to the other end of the third resistor 18 constituting part of the voltage divider and to one end of a fourth resistor 17 of which the other end is grounded.

A voltage regulator device 2 is made of the power transistor 10, flywheel diode 11, transistors 12, 13 and 14, Zener diode 15, resistors 16, 17, 18 and 20, and conduction ratio control circuit 19.

An auxiliary rectifier 6 is connected to the three-phase full-wave rectifier 5, a generator 1 being made of the armature coil 3, field coil 4, three-phase full-wave rectifier 5, and auxiliary rectifier 6. The voltage regulator device 2 is integrally mounted and fixed to the main frame of the generator 1. In the figure, represented by a character B is a battery terminal.

With the arrangement constructed as above, upon turning on the key switch 8, initial exciting current flows through the field coil 4 via the charge lamp 9. At the time when the key switch 8 is turned on, the status of the first and second transistors 12 and 13 are conductive and that of the third transistor 14 is non-conductive. Then, as the engine starts its rotation, the exciting coil 4 wound about the rotor starts generating electric energy. Resultantly, the voltage at the terminal rises and the charge lamp 9 extinguishes so that current is fed to the field coil 4 through the auxiliary rectifier 6.

When the generator gets a rotation rate so high as the voltage at the terminal L reaches a determined value, the Zener diode 15 turns on and the third transistor 14 also turns on. With the third transistor 14 turning on, the collector of the first transistor 13 becomes a low level to thereby render the power transistor 10 to turn off. At this time instant, the field current passing through the field coil 4 is returned via the flywheel diode 11 to dissipate electric energy. As the field current decreases and the voltage at the terminal L lowers below the determined voltage, again no current flows through the Zener diode 15, thereby rendering the third transistor 14 to turn off. With the transistor 14 turning off, the first transistor 13 is rendered to turn off and the power transistor 10 to turn on. With the power transistor 10 turning on, again the current passing through the field coil 4 increases. As above, in order to control the voltage at the terminal L to have the determined value, controlling of the turn on and off the power transistor 10 is performed. During such control, the conduction ratio control circuit 19 operates to maintain the conductive state of the second and first transistors 12 and 13.

Next, the detailed explanation of the voltage or conduction ratio control circuit 19 will be given with reference to FIGS. 2 to 4.

Figure 2:
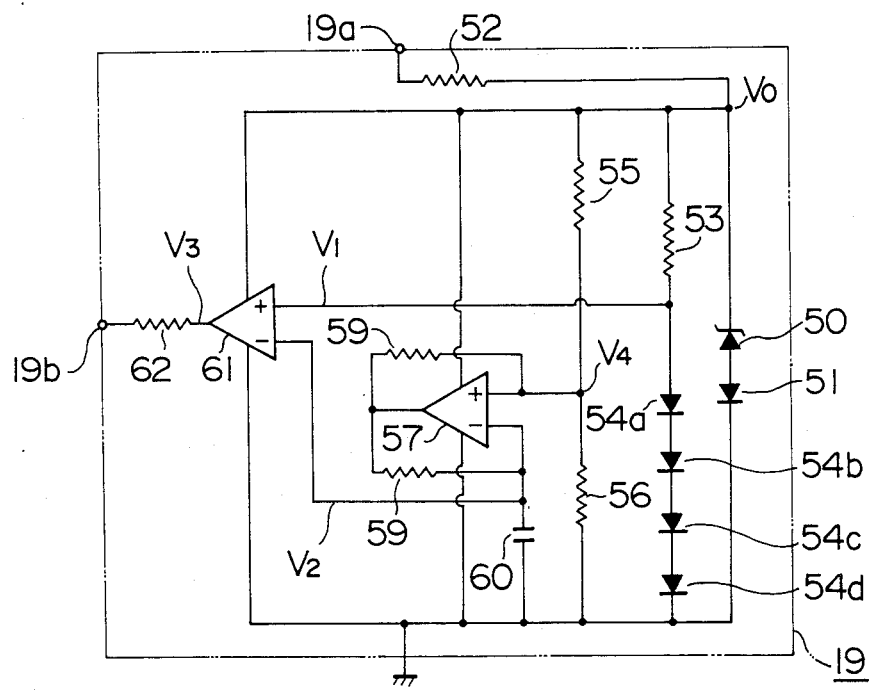
FIG. 2 is a detailed circuit diagram of the duty control or conduction ratio control circuit of FIG. 1.
Figure 3:
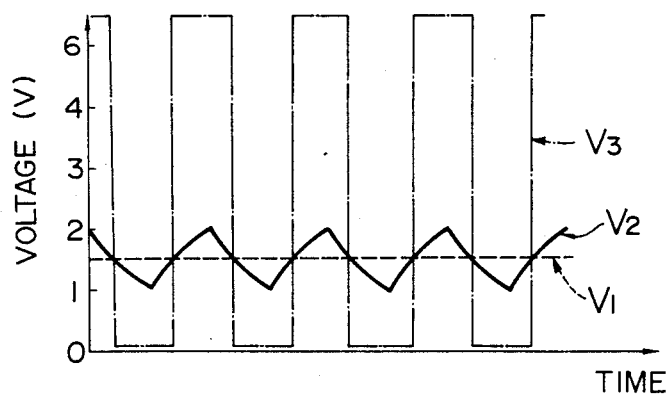
FIG. 3 shows output waveforms obtained at the circuit of FIG. 2.

In FIG. 2, a constant voltage circuit is made of a Zener diode 50, diode 51 and resistor 52. A constant voltage is obtained at the cathode of the Zener diode 50 as a cathode potential ($V_0$). The temperature characteristics of the Zener diode 50 and diode 51 are of the nature cancelling the effects of temperature change with respect to both diodes so that the constant voltage (in this embodiment, 7V) can be obtained irrespective of the temperature at the time. Numerical reference 53 represents a resistor, 54a, 54b and 54c represent diodes. The diodes have negative temperature coefficients, thus varying the anode potential ($V_1$) lower as the temperature rises.

A circuit composed of resistors 55 and 56, comparator 57, resistors 58 and 59, and capacitor 60 is an oscillation circuit, wherein the capacitor is charged while an output voltage of the comparator 57 takes a high level, thereafter as the voltage across the capacitor 60 reaches a preset voltage (2V), an output from the comparator 57 is inverted to take a low level, thereby lowering ($V_4$) to 1V. Then, the capacitor 60 is discharged. When the voltage across the capacitor 60 reaches a preset voltage (1V), an output from the comparator 57 is again inverted. By repeating such operations, the voltage across the capacitor 60 becomes of a voltage waveform as depicted by ($V_2$) in FIG. 3. Thus, another comparator 61 with a resistor 62 outputs a rectangular waveform by comparing the voltages obtained at ($V_1$) and ($V_2$).

Assuming that the voltage ($V_1$) is higher than 2V, the output of the comparator 61 is always at a high level with a duty ratio of 100% since the voltage ($V_2$) is always lower than 2V. Alternatively, assuming that the voltage ($V_1$) is lower than 1V, the output of the comparator 61 is always at a low level with a duty ratio of 0% since the voltage ($V_2$) is always higher than 1V. If the voltage ($V_1$) is between 1V and 2V, then a rectangular waveform is outputted as shown depicted as a voltage ($V_3$) in FIG. 3.

Figure 4:
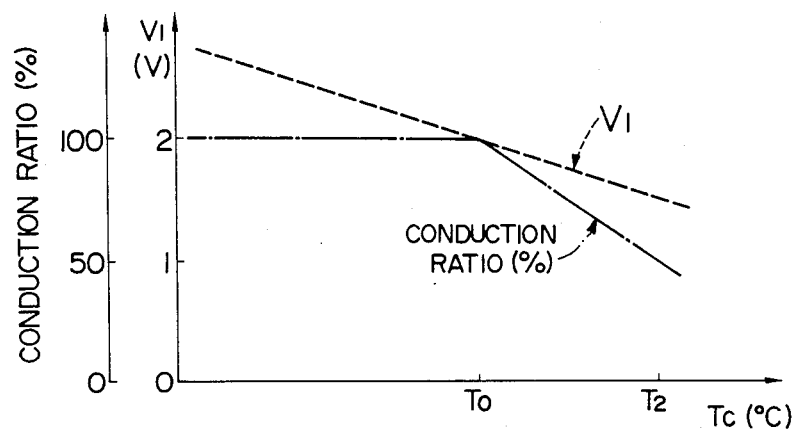
FIG. 4 shows the temperature characteristics of the control circuit shown in FIG. 2.

The voltage ($V_1$) varies with temperature, the temperature characteristics relative to the voltage being shown in FIG. 4. As a general rule, the forward voltage of a diode is 0.67V at a room temperature, and it decreases by 2 mV for each 1° C. temperature rise. Therefore, if the temperature of the control circuit is no more than $T_0$, the voltage ($V_1$) exceeds 2V so that the comparator output has a duty ratio of 100%. On the other hand, if the temperature rises higher than $T_0$, the voltage ($V_1$) drops lower than 2V so that the comparator output has a duty ratio of smaller than 100%.

Specifically, the control circuit 19 operates to control the current fed to the base of the second transistor 12 such that the conduction ratio becomes smaller when the temperature T of the voltage regulator device 2 exceeds the predetermined temperature of $T_c = T_0$.

More in particular, thermal breakage might occur when the temperature of the power transistor 10 exceeds the limit value $T_A$ of the power transistor junction temperature $T_j$. Therefore, as shown in FIG. 6, when the ambient temperature $T_c$ at the voltage regulator device 2 reaches a certain temperature $T_0$ (for example, 105° C.), electric energy to be generated by way of the conduction of the power transistor 10 is adapted to be controlled.

Figure 5:
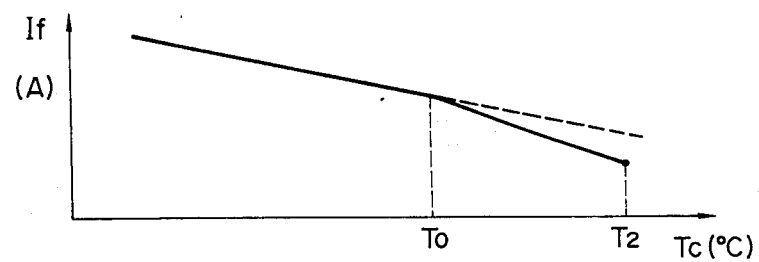
FIG. 5 is a graph of field current against temperature in the embodiment shown in FIG. 1.

This can be done by reducing the current (field current) $I_F$ passing through the field coil 4, as particularly shown in FIG. 5. Specifically, the field current is decreased by controlling the conduction ratio of the power transistor 10. The power transistor 10 is rendered to operate at the conduction ratio of 100% up to the temperature $T_0$ of the power transistor junction temperature $T_j$, while up to the temperature $T_2$ (for example 130° C.) from above the temperature $T_0$, the conduction rate is lowered such that the junction temperature reaches the limit value $T_A$ at the temperature $T_2$.

As above, the field current $I_F$ passing through the field coil 4 abruptly decreases as the ambient temperature exceeds the predetermined temperature $T_0$. Also, the rate of junction temperature rise of the power transistor 10 abruptly lowers over the temperature exceeding $T_c = T_0$.

Figure 6:
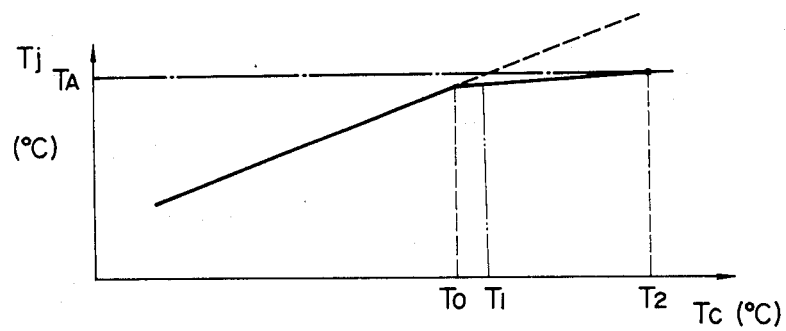
FIG. 6 shows the junction temperature characteristics against temperature at the regulator of the embodiment of FIG. 1.

As appreciated from the foregoing, the ambient temperature at which the power transistor junction temperature becomes a limit value $T_j = T_A$, is $T_c = T_1$ for the prior art device as shown in FIG. 6. However, according to the present embodiment, the temperature moves as high as $T_c = T_2$. That is, the allowable limit temperature $T_1$ for the conventional regulator device is changed to $T_2$, thus enabling to meet high temperature in the automobile engine room. In this case, the output current decreases as compared with the prior device due to the decrease of the field current $I_F$ in the temperature range higher than $T_c = T_1$. However, it is noted that the time during which the device operates in that range is quite short, thereby leaving no fear of complete discharge of the battery.

As seen from the above description, the present invention eliminates possible thermal breakage of the semiconductor elements in the regulator for a battery charging generator even if the ambient temperature rises abnormally high.

I claim:

1. A control apparatus for controlling a charging generator of an automobile engine, comprising:
   armature windings across which an alternating current output voltage is generated in response to rotation of the engine;
   rectifier circuit means connected to said armature winding for rectifying the alternating current output voltage into a direct current voltage;
   battery means for supplying electric energy and for being charged by the rectified output voltage of said armature windings through said rectifier circuit means;

field winding means for providing a magnetic field for said armature windings;

semiconductor switching means connected in series with said field winding means for intermittently interrupting an exciting current supplied to said field winding means;

voltage regulation means for sensing the rectified output voltage of said armature windings charging said battery and for providing a control signal to a control electrode of said semiconductor switching means so as to control the exciting current flowing into said field winding means through said semiconductor switching means;

means for detecting temperature at said voltage regulation mans;

means for generating a pulse train signal when the detected temperature is more than a preselected value, the conduction ratio of the pulse train signal varying in dependence on the temperature detected; and means for controlling an on-off operation of said semiconductor switching means in accordance with the conduction ratio of the pulse train signal of said pulse train signal generating means in addition to the control signal generated by said voltage regulation means.

2. A control apparatus according to claim 1, wherein said semiconductor switching means includes a power transistor having a junction temperature limit value, and said means for controlling the on-off operation of said semiconductor switching means controls said semiconductor switching means to have a conduction ratio lower than 100% so that said junction temperature limit value of said semiconductor switching means is not exceeded.

3. A control apparatus for controlling a charging generator of an automobile engine, comprising:

armature windings across which an alternating current output voltage is generated in response to rotation of the engine;

rectifier circuit means connected to said armature winding for rectifying the alternating current output voltage into a direct current voltage;

battery means for supplying electric energy and for being charged by the rectified output voltage of said armature windings though said rectifier circuit means;

field winding means for providing a magnetic field of said armature windings;

semiconductor switching means connected in series with said field winding means for intermittently interrupting an exciting current supplied to said field winding means;

voltage regulation means for sensing the rectified output voltage of said armature windings charging said battery and for providing a control signal to a control electrode of said semiconductor switching means so as to control the exciting current flowing into said field winding means through said semiconductor switching means;

means for detecting temperature at said voltage regulation means;

means for generating a pulse train signal when the detected temperature is more than a preselected value, the conduction ratio of the pulse train signal varying in dependence on the temperature detected; and measn for controlling an on-off operation of said semiconductor switching means in accordance with the conduction ratio of the pulse train signal of said pulse train signal generating means in addition to the control signal generated by said voltage regulation means;

wherein said semiconductor switching means includes a power transistor having a junction temperature limit value, and said means for controlling the on-off operation of said semiconductor switching means controls said semiconductor switching means to have a conduction ratio lower than 100% so that said junction temperature limit value of said semiconductor switching means is not exceeded; and wherein said voltage regulation means, said temperature detecting means, said pulse train signal generating means, and said means for controlling the on-off operation of said semiconductor switching means include a first transistor having an emitter connected to a base of said power transistor, a second transistor having an emitter connected to a base of said first transistor, said second transistor being connected through a first resistor to a positive terminal of said battery means, a third transistor having an emitter connected to a negative terminal of said battery means, said third transistor having a collector connected to a negative terminal of said battery means, said third transistor having a collector connected to a collector of said first transistor, said third transistor being connected through a second transistor to said positive terminal of said battery means, a Zener diode having an anode connected to a base of said third transistor and having a cathode connected to a junction of a third and fourth transistor, and said pulse train signal generating means being connected to a base for said second transistor.

4. A control apparatus for controlling a charging generator of an automobile engine, comprising:

armature windings across which an alternating current output voltage is generated in response to rotation of the engine;

rectifier circuit means connected to said armature windings for rectifying the alternating current output voltage into a direct current voltage;

battery means for supplying electric energy and for being charged by the rectified output voltage of said armature windings through said rectifier circuit means;

field winding means for providing a magnetic field for said armature windings;

semiconductor switching means connected in series with said field winding means for intermittently interrupting current supplied to said field winding means; and means for controlling said semiconductor switching means so as to control a field current flowing in said field winding means, said controlling means including temperature detecting means, and means responsive to the detected temperature for controlling an on-off operation of said semiconductor switching means so as to enable a field current to continuously flow in said field winding means when said detected temperature exceeds a predetermined value therefor.

5. A control apparatus according to claim 4, wherein said means responsive to the detected temperature includes a pulse train signal generating means for generating a pulse train signal when the detected temperature is more than the predetermined value, the conduction ratio of the pulse train signal varying in dependence on the temperature detected.

* * * * *